US011117835B2

(12) United States Patent
Brooks et al.

(10) Patent No.: US 11,117,835 B2
(45) Date of Patent: *Sep. 14, 2021

(54) FIRE RESISTANT CALCIUM SULPHATE-BASED PRODUCTS

(71) Applicant: SAINT-GOBAIN PLACO, Suresnes (FR)

(72) Inventors: Laura Brooks, Loughborough (GB); Robin Fisher, Loughborough (GB); Jan Rideout, Loughborough (GB)

(73) Assignee: SAINT-GOBAIN PLACO, Suresnes (FR)

(*) Notice: Subject to any disclaimer, the term of this patent is extended or adjusted under 35 U.S.C. 154(b) by 0 days.

This patent is subject to a terminal disclaimer.

(21) Appl. No.: 16/750,623

(22) Filed: Jan. 23, 2020

(65) Prior Publication Data

US 2020/0157007 A1 May 21, 2020

Related U.S. Application Data

(63) Continuation of application No. 15/525,523, filed as application No. PCT/EP2015/076787 on Nov. 17, 2015, now Pat. No. 10,584,063.

(30) Foreign Application Priority Data

Nov. 21, 2014 (GB) .................................... 1420767

(51) Int. Cl.
*C04B 28/14* (2006.01)
*C04B 111/28* (2006.01)
*C04B 111/34* (2006.01)

(52) U.S. Cl.
CPC ........... *C04B 28/14* (2013.01); *C04B 2111/28* (2013.01); *C04B 2111/34* (2013.01); *Y02W 30/91* (2015.05)

(58) Field of Classification Search
CPC ..... C04B 14/08; C04B 14/106; C04B 18/101; C04B 22/08; C04B 22/085; C04B 22/124; C04B 28/14; C04B 2111/28; C04B 2111/34; Y02W 30/91
See application file for complete search history.

(56) References Cited

U.S. PATENT DOCUMENTS

| 2,526,066 | A | ‡ | 10/1950 | Croce | C04B 28/14 106/67 |
| 2,744,022 | A | ‡ | 5/1956 | Croce | C04B 28/14 52/596 |
| 3,616,173 | A | ‡ | 10/1971 | Green | C04B 14/303 428/33 |
| 3,782,992 | A | ‡ | 1/1974 | Uchikawa | C04B 22/14 106/77 |
| 3,980,487 | A | ‡ | 9/1976 | Akabayashi | C04B 24/14 106/64 |
| 4,021,259 | A | | 5/1977 | Komatsu et al. | |
| 4,664,707 | A | ‡ | 5/1987 | Wilson | C04B 14/38 106/18 |
| 4,722,866 | A | ‡ | 2/1988 | Wilson | C04B 28/14 106/15 |
| 5,346,550 | A | ‡ | 9/1994 | Kunzi | C04B 28/14 106/708 |
| 5,985,013 | A | ‡ | 11/1999 | Kofler | C09K 21/02 106/18 |
| 6,013,125 | A | ‡ | 1/2000 | Quraishi | B22C 1/00 106/38 |
| 6,475,275 | B1 | ‡ | 11/2002 | Nebesnak | C04B 28/02 106/694 |
| 6,569,541 | B1 | ‡ | 5/2003 | Martin | C04B 28/14 428/53 |
| 7,101,430 | B1 | ‡ | 9/2006 | Pike | C04B 28/04 106/70 |
| 8,016,960 | B2 | ‡ | 9/2011 | Wittbold | B01F 13/103 156/39 |
| 10,584,063 | B2 | * | 3/2020 | Brooks | C04B 28/14 |
| 10,662,113 | B2 | * | 5/2020 | Brooks | C04B 24/42 |
| 2003/0138614 | A1 | ‡ | 7/2003 | Leclercq | C04B 14/26 428/29 |
| 2004/0092614 | A1 | ‡ | 5/2004 | Hilton | B28C 5/388 521/82 |
| 2006/0107876 | A1 | | 5/2006 | Sandmeyer et al. | |

(Continued)

FOREIGN PATENT DOCUMENTS

CN 1071156 A ‡ 4/1993
CN 1071156 A 4/1993

(Continued)

OTHER PUBLICATIONS

Apr. 20, 2019 Search Report issued in Russian Patent Application No. 2017121655/03(037447).‡
Mar. 18, 2019 Office Action issued in Chinese Patent Application No. 201580062741.5.‡
Feb. 10, 2016 Search Report issued in International Patent Application No. PCT/EP2015/076785.‡
May 23, 2017 International Preliminary Report on Patentability issued in International Patent Application No. PCT/EP2015/076785.‡
Feb. 10, 2016 Written Opinion issued in International Patent Application No. PCT/EP2015/076785.‡
May 7, 2015 Search Report issued in Great Britain Patent Application No. GB1420766.6.‡
Aug. 1, 2018 Office Action issued in U.S. Appl. No. 15/525,467.‡
Nov. 20, 2018 Office Action issued in U.S. Appl. No. 15/525,467.‡

(Continued)

*Primary Examiner* — Anthony J Green
(74) *Attorney, Agent, or Firm* — Oliff PLC

(57) ABSTRACT

The present invention provides a calcium sulphate-based product (e.g. a wall board) comprising gypsum, a pozzolan source such as a clay additive, rice husk ash or diatomaceous earth and a metal salt additive. The product may be produced by drying an aqueous slurry comprising calcined gypsum, the pozzolan source and the metal salt additive. The clay additive may be a kaolinitic clay. The metal salt additive may be a magnesium salt e.g. magnesium nitrate, magnesium chloride or magnesium hydroxide.

13 Claims, No Drawings

(56) References Cited

U.S. PATENT DOCUMENTS

| | | | | |
|---|---|---|---|---|
| 2010/0071597 A1 ‡ | 3/2010 | Perez-Pena | ............ | C04B 28/021 106/70 |
| 2010/0136259 A1 ‡ | 6/2010 | O'Keefe | ............ | B01F 11/0258 427/56 |
| 2011/0195241 A1 ‡ | 8/2011 | Yu | ........................... | E04C 2/043 428/22 |
| 2013/0199418 A1 ‡ | 8/2013 | Yamashita | ............ | C04B 28/145 106/78 |
| 2014/0121303 A1* | 5/2014 | Hagen | ................... | C04B 28/145 524/5 |
| 2014/0371352 A1 ‡ | 12/2014 | Dantin | ................. | B01F 3/1228 524/5 |

FOREIGN PATENT DOCUMENTS

| | | | |
|---|---|---|---|
| CN | 1443146 A | 9/2003 | |
| CN | 1443146 A ‡ | 9/2003 | ............ C04B 28/14 |
| CN | 101265067 A ‡ | 9/2008 | |
| CN | 101265067 A | 9/2008 | |
| CN | 102173726 A | 9/2011 | |
| CN | 102173726 A ‡ | 9/2011 | ............ C04B 28/32 |
| CN | 102464478 A | 5/2012 | |
| CN | 102464478 A ‡ | 5/2012 | |
| CN | 102826823 A ‡ | 12/2012 | |
| CN | 102826823 A | 12/2012 | |
| CN | 102850031 A | 1/2013 | |
| CN | 102850031 A ‡ | 1/2013 | |
| CN | 102464478 B | 2/2014 | |
| CN | 103626439 A | 3/2014 | |
| CN | 103626439 A ‡ | 3/2014 | |
| CN | 103803821 A | 5/2014 | |
| CN | 103803821 A ‡ | 5/2014 | |
| CN | 103979837 A | 8/2014 | |
| CN | 103979837 A ‡ | 8/2014 | |
| CN | 104016649 A | 9/2014 | |
| CN | 104016649 A ‡ | 9/2014 | |
| CN | 104058644 A ‡ | 9/2014 | |
| CN | 104058644 A | 9/2014 | |
| EP | 0258064 A3 | 10/1989 | |
| EP | 0258064 A3 ‡ | 10/1989 | ............ C04B 11/00 |
| EP | 1 081 113 A1 | 3/2001 | |
| EP | 1081113 A1 ‡ | 3/2001 | ............... E04C 2/06 |
| EP | 2 502 891 A1 | 9/2012 | |
| EP | 2502891 A1 ‡ | 9/2012 | ......... C04B 40/0042 |
| JP | 72040693 B | 8/1968 | |
| JP | S54-083929 A | 7/1979 | |
| JP | S55-126559 A ‡ | 9/1980 | |
| JP | S55-126559 A | 9/1980 | |
| JP | 57-71841 A ‡ | 5/1982 | ............ C04B 22/12 |
| JP | S57-71841 A | 5/1982 | |
| JP | H04-2640 A ‡ | 1/1992 | |
| JP | H042640 A | 1/1992 | |
| JP | 105-097487 A | 4/1993 | |
| JP | H05-097487 A ‡ | 4/1993 | |
| JP | 107-133147 A | 5/1995 | |
| JP | H07-133147 A ‡ | 5/1995 | |
| JP | H10-245256 A ‡ | 9/1998 | |
| JP | H10-245256 A | 9/1998 | |
| JP | 2986986 B2 ‡ | 12/1999 | |
| JP | 2986986 B2 | 12/1999 | |
| JP | 2005-187278 A ‡ | 7/2005 | ............ C04B 28/02 |
| JP | 2005-187278 A | 7/2005 | |
| JP | 2009-263217 A | 11/2009 | |
| JP | 2009-263217 A ‡ | 11/2009 | ............ C04B 28/14 |
| KR | 100835702 B1 | 6/2008 | |
| KR | 100835702 B1 ‡ | 6/2008 | |
| RU | 2260572 C1 ‡ | 9/2005 | |
| RU | 2260572 C1 | 9/2005 | |
| RU | 2285677 C1 | 10/2006 | |
| RU | 2285677 C1 ‡ | 10/2006 | |
| RU | 2383410 C1 | 3/2010 | |
| RU | 2383410 C1 ‡ | 3/2010 | |
| RU | 2387607 C2 | 4/2010 | |
| RU | 2387607 C2 ‡ | 4/2010 | |
| RU | 2415093 C1 | 3/2011 | |
| SU | 1629269 A1 ‡ | 2/1991 | ............ C04B 28/08 |
| SU | 1629269 A1 | 2/1991 | |
| WO | 99/08979 A1 | 2/1999 | |
| WO | WO-99/08979 A1 ‡ | 2/1999 | ............ C04B 22/16 |
| WO | 00/06518 A1 | 2/2000 | |
| WO | WO-00/06518 A1 ‡ | 2/2000 | ............ C04B 41/70 |
| WO | 2012/116313 A1 | 8/2012 | |
| WO | WO-2012/116313 A1 ‡ | 8/2012 | ............ E04C 2/043 |
| WO | 2013048351 A1 | 4/2013 | |
| WO | WO-2013048351 A1 ‡ | 4/2013 | ............ C04B 28/14 |
| WO | 2013-098859 A1 | 7/2013 | |
| WO | WO-2013-098859 A1 ‡ | 7/2013 | ............... B32B 3/10 |

OTHER PUBLICATIONS

Sep. 12, 2019 English Translation of Office Action issued in Japanese Patent Application No. 2017-527560.‡
May 7, 2015 Search Report issued in British Patent Application No. 1420768.2.‡
Aug. 15, 2018 Examination Report issued in European Patent Application No. 15 794 947.0.‡
Yen, Chen, "6. Additives that reduce the tendency to shrink and crack," Gypsum building materials (second edition), China Building Materials Industry Press, 2012, pp. 283-285, ISBN 978-7-80227-549-2.‡
Feb. 1, 2019 Examination Report issued in European Patent Application No. 15 794 947.0.‡
May 23, 2017 International Preliminary Report on Patentability issued in International Patent Application No. PCT/EP2015/076786.‡
Sep. 9, 2019 Office Action issued in Russian Patent Application No. 2017121655.‡
May 5, 2019 Office Action issued in Chinese Patent Application No. 201580062107.1.‡
Feb. 17, 2016 International Search Report issued with International Patent Application No. PCT/EP2015/076786.‡
Feb. 17, 2016 Written Opinion issued with International Patent Application No. PCT/EP2015/076786.‡
Jul. 23, 2019 Office Action issued in U.S. Appl. No. 15/525,467.‡
May 5, 2019 Office Action issued in Chinese Patent Application No. 201580062495.3.‡
Mar. 18, 2019 Office Action issued in U.S. Appl. No. 15/525,467.‡
Feb. 10, 2016 Written Opinion issued in International Patent Application No. PCT/EP2015/076787.‡
May 7, 2015 Search Report issued in British Patent Application No. 1420767.4.‡
Feb. 10, 2016 Search Report issued in International Patent Application No. PCT/EP2015/076787.‡
Jan. 11, 2021 Office Action issued in U.S. Appl. No. 15/524,956.
Jan. 25, 2021 Office Action issued in European Patent Application No. 20 159 919.8.
Jan. 27, 2020 Office Action issued in U.S. Appl. No. 15/524,956.
Lewis, Sr., Hawley's Condensed Chemical Dictionary, Twelfth Edition, p. 42, 1993.
Aug. 19, 2019 Office Action Issued in U.S. Appl. No. 15/525,523.
Jun. 19, 2020 Office Action issued in U.S. Appl. No. 15/524,956.

\* cited by examiner
‡ imported from a related application

FIRE RESISTANT CALCIUM SULPHATE-BASED PRODUCTS This is a Continuation of U.S. Application No. 15/525,523, filed May 9, 2017 (now U.S. Pat. No. 10,584,063), which in turn is a U.S. National stage of PCT/EP2015/076787, filed Nov. 17, 2015, which claims the benefit of GB Application No. 1420767.4, filed Nov. 21, 2014. The disclosure of the prior applications is hereby incorporated by reference herein in its entirety.

This invention relates to improved fire resistant calcium sulphate-based products and, in particular, to calcium sulphate-based building/construction products having improved strength after exposure to high temperatures.

BACKGROUND

Calcium sulphate-based products are widely used in the construction of buildings, for example, to form internal partitions (using wallboard, also known as dry wall, gypsum board or plaster board) and ceilings or to encase ducts (e.g. ventilation ducts) within buildings.

Calcium sulphate-based products such as wallboard are typically formed by drying an aqueous slurry of the hemihydrate of calcium sulphate ($CaSO_4 \cdot \frac{1}{2}H_2O$), also known as calcined gypsum or stucco, between two sheets of lining paper or fibreglass matting. As the slurry dries and the calcined gypsum is hydrated, a hard, rigid core of gypsum (calcium sulphate dihydrate—($CaSO_4 \cdot 2H_2O$)) sandwiched between the lining sheets/mats is formed.

When wallboard is exposed to high temperatures such as those experienced in a building fire, or those experienced by wallboards used for encasing ducts carrying high temperature fluids, the water of crystallization contained within the gypsum is driven off to yield the anhydrite of calcium sulphate. Initially, this has the advantage that heat transfer across the wallboard is reduced thus helping to contain the heat emanating from a duct or generated during a building fire. However, at temperatures around 400-450° C., the initially formed AIII phase anhydrite (also known as $\gamma$-$CaSO_4$ or "soluble" anhydrite) converts to the AII phase (or "insoluble" anhydrite) and this phase change results in shrinkage of the wallboard i.e. a loss of dimensional stability. This shrinkage (which may be around 2% of the wallboard's length or width or around 6 vol %) often causes the wallboards to pull away from their supporting structures. This is obviously undesirable. In situations where wallboard is used for internal partitions and a fire breaks out, shrinkage can leaves gaps exposing rooms adjacent to the fire source to the effects of the heat/fire. Gaps also allow ingress of oxygen into the fire source thus fuelling the fire and negating the effects of any fire doors.

At higher temperatures (in excess of 600° C.), the insoluble anhydrite goes on to sinter resulting in large reductions in wallboard volume. This results in extreme shrinkage which eventually causes collapse of the internal walls/ceilings/duct casings as they are no longer held by their supporting structures.

Furthermore, once the chemical composition of the gypsum has been altered by the heat, the wallboard loses strength and, ultimately, structural integrity. Typically, the gypsum core of wallboard that has been exposed to high temperatures such as those generated during building fires crumbles to a fine dust and thus the wallboard effectively disintegrates.

Efforts have been made to improve the fire resistance of calcium sulphate-based products in an attempt to reduce shrinkage and/or maintain strength/structural integrity.

It is known e.g. from U.S. Pat. Nos. 2,526,066 and 2,744,022, to add a combination of unexpanded vermiculite and non-combustible fibres to the aqueous calcined gypsum slurry during the manufacture of wallboard.

During heat exposure the vermiculite contained within the wallboard core expands by an amount comparable to the amount of gypsum shrinkage thus resisting the shrinkage of the wallboard. The fibres, which are known to be asbestos and/or glass, form a network which mechanically bind the gypsum core together and reduces the likelihood of mechanical failure.

Wallboard containing unexpanded vermiculite and/or glass fibres has found extensive commercial excess.

U.S. Pat. No. 3,616,173 proposed adding small amounts (preferably about 2-5 wt %) of clay, colloidal silica or colloidal alumina to the gypsum core in addition to the glass fibres and vermiculite. The intention was to reduce the density of the fire resistant wallboard. Amounts greater than 20 wt % were found to result in a weak core that did not bind satisfactorily with the paper lining sheets.

US2003/0138614 discloses a fire resistant gypsum wallboard containing, in addition to unexpended vermiculite and glass fibres, 3-25 wt % of a mineral additive which may be a clay and 3-15 wt % hydrated alumina. Best results are achieved using 10-15 wt % of a clay which comprises 25% kaolinite.

U.S. Pat. No. 4,664,707 discloses a gypsum wall board made from a slurry containing glass fibres, calcium sulphate crystal fibres and 0.5-5 wt % clay. The clay is preferably a kaolinitic clay.

U.S. Pat. No. 6,569,541 discloses a water-resistant gypsum wallboard containing 5-15 wt % of a mineral additive which may be a clay such as kaolinite.

U.S. Pat. No. 5,985,013 discloses an ablative type heat protecting material containing calcium sulphate hemihydrate and a hydrated salt. A number of hydrated salts are used including magnesium nitrate hexahydrate (used in an amount of 40 wt % based on the weight of dry ingredients). The time taken for heat transfer across the heat ablative material was recorded. No mention is made of any effect on the shrinkage of the material after heating.

Calcium sulphate-based products are also used to cast metal or glass objects. Calcium sulphate moulds are heated to 700-900° C. prior to being filled with molten metal/glass. It is important to control high temperature shrinkage of such calcium sulphate-based moulds to ensure that the moulds do not leak and to ensure that the cast metal/glass products are not warped.

A preferred aim of the present invention is to provide an improved fire/heat resistant calcium-sulphate-based product having improved strength, hardness and structural integrity after heat exposure e.g. during a building fire. Such an improved fire resistant product may have particular use as a building product e.g. wallboard or panels for forming internal partitions in buildings, ceiling tiles, wallboard or panels for encasing ventilation/smoke extraction ducting, joint filler materials for joining wallboard/panels/tiles or for moulds for use in metal/glass product casting.

SUMMARY OF THE INVENTION

Accordingly, in a first aspect, the present invention provides a calcium sulphate-based product comprising gypsum, a pozzolan source and a metal salt additive.

In a second aspect, the present invention provides a calcium sulphate-based product wherein the product is formed from drying an aqueous slurry containing calcined gypsum, a pozzolan source and a metal salt additive.

In a third aspect, the present invention provides a method of forming a calcium sulphate-based product by drying an aqueous slurry comprising calcined gypsum, a pozzolan source and a metal salt.

In a fourth aspect, the present invention provides the use of a combination of a pozzolan source and a metal salt additive for improving strength during heat exposure of a calcium sulphate-based product.

In a fifth aspect, the present invention provides a calcium sulphate-based composition for use in forming a calcium sulphate-based product by drying an aqueous slurry of the calcium sulphate-based composition, the calcium sulphate-based composition comprising calcined gypsum, a pozzolan source and a metal salt.

The present inventors have found that adding a combination of a pozzolan source and a metal salt results in a calcium sulphate-based product which maintains its structural integrity and strength and dimensional stability even after heating up to 1000° C. It is thought that a sintering process occurs which binds the gypsum together and helps improve the structural integrity and hardness. Analysis of the product after heating (and after the gypsum has been removed using EDTA) shows that the pozzolan source forms an interlinking network structure which helps to bind the gypsum and thus increase hardness and strength. The presence of the metal salt reduces the temperature at which the pozzolan source transforms to the interlinking network structure and allows a reduction in the amount of pozzolan source needed. This may be as a result of the inclusion of the metal salt in the network structure.

The term "pozzolan source" is intended to refer to materials that are themselves pozzolanic (e.g. rice husk ash, fly ash, volcanic ashes and pumices or diatomaceous earth) or that yield pozzolanic material upon heating (e.g. a clay additive such as kaolinitic clay material which yields metakaolin upon heating).

The term "kaolinitic clay material" encompasses kaolinite ($Al_2Si_2O_5(OH)_4$), polymorphs of kaolinite such as dickite, halloysite and nacrite, ball clay (which comprises 20-80% kaolinite, 10-25% mica, 6-65% quartz), fire clay and flint clay. An example of a suitable clay additive is Puroflo 31™ manufactured by Sibelco and which comprises 66% kaolinite, 23% mica, 6% feldspar and 1% quartz.

The clay additive is preferably un-calcined clay.

In the slurry used to form the calcium sulphate-based product and in the calcium sulphate-based composition, the clay additive may be provided in an amount between 5 wt % and 30 wt %, preferably between 5 and 25 wt % and most preferably between 10 and 25 wt % (where wt % is based on the weight of the calcined gypsum, clay additive and metal salt).

In the slurry used to form the calcium sulphate-based product and in the calcium sulphate-based composition, the rice husk ash, fly ash, volcanic ashes or pumices or diatomaceous earth may be provided in an amount greater than 10 wt %, preferably greater than 20 wt % and most preferably equal to or greater than 25 wt % (where wt % is based on the weight of the calcined gypsum, pozzolan source and metal salt).

In the calcium sulphate-based product, the clay additive may be provided in an amount between 5 wt % and 30 wt %, preferably between 5 and 25 wt % and most preferably between 10 and 25 wt % (where wt % is based on the weight of the gypsum, clay additive and metal salt).

In preferred embodiments, the amount of clay additive (e.g. kaolin) in the slurry/calcium sulphate-based composition and in the finished product is less than 25 wt %.

In the calcium sulphate-based product, the rice husk ash, diatomaceous earth, fly ash, volcanic ashes or pumices may be provided in an amount greater than 10 wt %, preferably greater than 15 wt % and most preferably equal to or greater than 20 wt % (where wt %/o is based on the weight of the gypsum, pozzolan source and metal salt).

The metal salt is preferably a metal salt which decomposes between a temperature of 300-500° C. to yield a metal oxide.

The metal in the metal salt may be an alkaline earth metal e.g. calcium or magnesium. The metal may be a transition metal e.g. copper or zinc. The metal may be aluminium.

Preferably the metal is magnesium.

The salt may be a nitrate, a carbonate, a hydrogen carbonate, a sulphate, a hydroxide or chloride. The salt may be hydrated.

Preferred metal salts are the nitrates of magnesium, copper, aluminium, calcium and zinc, magnesium chloride and magnesium hydroxide.

Magnesium nitrate (e.g. the hexahydrate) and magnesium chloride (e.g. the hexahydrate) are preferred metal salts.

In the slurry used to form the calcium sulphate-based product and in the calcium sulphate-based composition, the metal salt may be provided in an amount between 5 and 25 wt %, preferably between 10 and 25 wt % e.g. between 10 and 20 wt % (where wt % is based on the weight of the calcined gypsum, pozzolan source and metal salt).

In the calcium sulphate-based product, the metal salt may be provided in an amount between 5 and 25 wt %, preferably between 10 and 25 wt % e.g. between 10 and 20 wt % (where wt % is based on the weight of the gypsum, pozzolan source and metal salt).

In preferred embodiments, the wt % of clay additive and metal salt in the slurry/calcium sulphate-based composition and in the product are equal and, preferably, between 10 and 25 wt %.

The term "gypsum" is intended to refer predominantly to calcium sulphate dihydrate ($CaSO_4 \cdot 2H_2O$).

The term "calcined gypsum" is intended to refer predominantly to calcium sulphate hemihydrate ($CaSO_4 \cdot \frac{1}{2}H_2O$) but may also encompass any other calcium sulphate compound having a lower bound water content than calcium sulphate dihydrate (e.g. calcium sulphate anhydrite).

In the slurry used to form the calcium sulphate-based product and in the calcium sulphate-based composition, the calcined gypsum is preferably provided in an amount between 50 wt % and 85 wt %, more preferably between 50 and 80 wt % e.g. between 60 and 80 wt % (where wt % is based on the weight of the calcined gypsum, pozzolan source and metal salt).

In the calcium sulphate-based product, the gypsum is preferably provided in an amount between 50 wt % and 85 wt %, more preferably between 55 and 80 wt % e.g. between 60 and 80 wt % (where wt % is based on the weight of the gypsum, pozzolan source and metal salt).

In a particularly preferred embodiment, the calcium-sulphate based product comprises 50 wt %-85 wt % gypsum, a pozzolan source and 10 wt %-25 wt % metal salt and may be formed from drying an aqueous slurry containing 50-85 wt % calcined gypsum, a pozzolan source and 10 wt % to 25 wt % metal salt (where wt % is based on the weight of the gypsum, pozzolan source and metal salt).

For this embodiment, the amounts and nature of the pozzolan source, the preferred amounts of gypsum/calcined gypsum and the preferred amounts/nature of the metal salt may be as described above.

In another particularly preferred embodiment, the calcium-sulphate based product comprises 50 wt %-85 wt % gypsum, 20 wt % or more of a pozzolan source and metal salt, wherein the pozzolan source is rice husk ash or diatomaceous earth and may be formed from drying an aqueous slurry containing 50-85 wt % calcined gypsum, 25 wt % or more of the pozzolan source and a metal salt (where wt % is based on the weight of the (calcined) gypsum, pozzolan source and magnesium nitrate).

For this embodiment, the preferred amounts and nature of the pozzolan source, the preferred amounts of gypsum/calcined gypsum and the preferred amounts and nature of the metal salt may be as described above.

In yet another particularly preferred embodiment, the calcium-sulphate based product comprises 50 wt %-85 wt % gypsum, 5-30 wt % of a pozzolan source and metal salt, wherein the pozzolan source is a kaolinitic clay and may be formed from drying an aqueous slurry containing 50-85 wt % calcined gypsum, 5-30 wt % of the pozzolan source and a metal salt (where wt % is based on the weight of the (calcined) gypsum, pozzolan source and magnesium nitrate).

For this embodiment, the preferred amounts and nature of the pozzolan source, the preferred amounts of gypsum/calcined gypsum and the preferred amounts and nature of the metal salt may be as described above.

In some embodiments, the calcium sulphate-based product contains substantially no inorganic fibres e.g. no glass or asbestos fibres. The present inventors have found that the addition of a combination of a pozzolan source and a metal salt can help maintain strength and structural integrity after heating even in the absence of a fibrous network.

However, in some embodiments, the calcium sulphate-based product may contain inorganic fibres (e.g. glass fibres) and/or matting (e.g. glass matting) as this may help improve strength of the product prior to heating.

The calcium sulphate-based product may contain additives such as accelerators, retarders, foaming/anti-foaming agents, fluidisers etc. The accelerators may be, for example, freshly ground gypsum having an additive of sugar or surfactant. Such accelerators may include Ground Mineral NANSA (GMN), heat resistant accelerator (HRA) and ball milled accelerator (BMA). Alternatively, the accelerator may be a chemical additive such as aluminium sulphate, zinc sulphate or potassium sulphate. In certain cases, a mixture of accelerators may be used, e.g. GMN in combination with a sulphate accelerator. As a further alternative, ultrasound may be used to accelerate the setting rate of the slurry, e.g. as described in US2010/0136259.

The term "calcium sulphate-based product" may include building materials such as wallboards (with or without liners) (with or without fibrous reinforcement), tiles (e.g. ceiling tiles), duct encasement panels, joint filler materials (e.g. for joining adjacent wallboards/tiles/panels etc.), plaster compositions or moulds for metal casting.

The term "calcium sulphate-based" will be readily understood as meaning that the product comprises gypsum as a major component i.e. that gypsum is the largest single component in terms of wt % of the product. The term may mean that the product comprises gypsum in 40 wt %, 50 wt %, 60 wt %, 70 wt %, 80 wt %, 90 wt % or greater based on the total weight of the product.

The calcium sulphate-based product may be a composite product e.g. it may be a wallboard having a gypsum matrix core (containing the clay and metal salt additives) sandwiched between two liners (e.g. paper liners or fibreglass matting).

EXPERIMENTAL

The following examples show products having improved strength after exposure to high temperatures and are given by way of illustration only.

Control Sample 1

600 g of water at 40° C. was mixed with 3.75 g of John Mansville glass fibres. 750 g of calcined gypsum was added to the water and the mixture was mechanically blended for 10 seconds to form a slurry. A small amount of the slurry was poured into a 320 mm×120 mm×12.5 mm silicone mould and glass tissue was pressed into the slurry to the base of the mould. The remaining slurry was poured into the mould and further layer of glass tissue was laid onto the top of the slurry. The sample was dried at 40° C. overnight (minimum 12 hours).

Control Sample 2—Kaliln (30 wt %)

600 g of water at 40° C. was mixed with 3.75 g of John Mansville glass fibres. 225 g of kaolin and 525 g of calcined gypsum was added to the water and the mixture was mechanically blended for 10 seconds to form a slurry. A small amount of the slurry was poured into a 320 mm×120 mm×12.5 mm silicone mould and glass tissue was pressed into the slurry to the base of the mould. The remaining slurry was poured into the mould and further layer of glass tissue was laid onto the top of the slurry. The sample was dried at 40° C. overnight (minimum 12 hours).

Control Sample 3—Magnesium Nitrate (1 wt %)

600 g of water at 40° C. was mixed with 3.75 g of John Mansville glass fibres and 75 g of magnesium nitrate hexahydrate. 750 g of calcined gypsum was added to the water and the mixture was mechanically blended for 10 seconds to form a slurry. A small amount of the slurry was poured into a 320 mm×120 mm×12.5 mm silicone mould and glass tissue was pressed into the slurry to the base of the mould. The remaining slurry was poured into the mould and further layer of glass tissue was laid onto the top of the slurry. The sample was dried at 40° C. overnight (minimum 12 hours).

Control Sample 4—Calcium Nitrate (10 wt %)

600 g of water at 40° C. was mixed with 3.75 g of John Mansville glass fibres and 75 g of calcium nitrate tetrahydrate. 750 g of calcined gypsum was added to the water and the mixture was mechanically blended for 10 seconds to form a slurry. A small amount of the slurry was poured into a 320 mm×120 mm×12.5 mm silicone mould and glass tissue was pressed into the slurry to the base of the mould. The remaining slurry was poured into the mould and further layer of glass tissue was laid onto the top of the slurry. The sample was dried at 40° C. overnight (minimum 12 hours).

Control Sample 5—Magnesium Hydroxide (10 wt %)

600 g of water at 40° C. was mixed with 3.75 g of John Mansville glass fibres and 75 g magnesium hydroxide. 750 g of calcined gypsum was added to the water and the mixture was mechanically blended for 10 seconds to form a slurry. A small amount of the slurry was poured into a 320 mm×120 mm×12.5 mm silicone mould and glass tissue was pressed into the slurry to the base of the mould. The remaining slurry was poured into the mould and further layer of glass tissue was laid onto the top of the slurry. The sample was dried at 40° C. overnight (minimum 12 hours).

Control Sample 6—Aluminium Nitrate (10 wt %)

600 g of water at 40° C. was mixed with 3.75 g of John Mansville glass fibres and 75 g aluminium nitrate nonahydrate. 750 g of calcined gypsum was added to the water and the mixture was mechanically blended for 10 seconds to form a slurry. A small amount of the slurry was poured into a 320 mm×120 mm×12.5 mm silicone mould and glass tissue was pressed into the slurry to the base of the mould. The remaining slurry was poured into the mould and further layer of glass tissue was laid onto the top of the slurry. The sample was dried at 40° C. overnight (minimum 12 hours).

Example 1—Magnesium Nitrate (9 wt %) Kaolin (27 wt %)

600 g of water at 40° C. was mixed with 3.75 g of John Mansville glass fibres and 75 g of magnesium nitrate hexahydrate. 225 g of kaolin and 525 g of calcined gypsum was added to the water and the mixture was mechanically blended for 10 seconds to form a slurry. A small amount of the slurry was poured into a 320 mm×120 mm×12.5 mm silicone mould and glass tissue was pressed into the slurry to the base of the mould. The remaining slurry was poured into the mould and further layer of glass tissue was laid onto the top of the slurry. The sample was dried at 40° C. overnight (minimum 12 hours).

Example 2—Magnesium Nitrate (23 wt %)/Kaolin (23 wt %)

600 g of water at 40° C. was mixed with 3.75 g of John Mansville glass fibres and 225 g of magnesium nitrate hexahydrate. 225 g of kaolin and 525 g of calcined gypsum was added to the water and the mixture was mechanically blended for 10 seconds to form a slurry. A small amount of the slurry was poured into a 320 mm×120 mm×12.5 mm silicone mould and glass tissue was pressed into the slurry to the base of the mould. The remaining slurry was poured into the mould and further layer of glass tissue was laid onto the top of the slurry. The sample was dried at 40° C. overnight (minimum 12 hours).

Example 3—Magnesium Nitrate (16.5 wt %)/Kaolin (16.5 wt %)

600 g of water at 40° C. was mixed with 3.75 g of John Mansville glass fibres and 150 g of magnesium nitrate hexahydrate. 150 g of kaolin and 600 g of calcined gypsum was added to the water and the mixture was mechanically blended for 10 seconds to form a slurry. A small amount of the slurry was poured into a 320 mm×120 mm×12.5 mm silicone mould and glass tissue was pressed into the slurry to the base of the mould. The remaining slurry was poured into the mould and further layer of glass tissue was laid onto the top of the slurry. The sample was dried at 40° C. overnight (minimum 12 hours).

Example 4—Magnesium Nitrate (13 wt %)/Kaolin (13 wt %)

600 g of water at 40° C. was mixed with 3.75 g of John Mansville glass fibres and 112.5 g of magnesium nitrate hexahydrate. 112.5 g of kaolin and 637.5 g of calcined gypsum was added to the water and the mixture was mechanically blended for 10 seconds to form a slurry. A small amount of the slurry was poured into a 320 mm×120 mm×12.5 mm silicone mould and glass tissue was pressed into the slurry to the base of the mould. The remaining slurry was poured into the mould and further layer of glass tissue was laid onto the top of the slurry. The sample was dried at 40° C. overnight (minimum 12 hours).

Example 5—Magnesium Nitrate (11 wt %)/Kaolin (11 wt %)

600 g of water at 40° C. was mixed with 3.75 g of John Mansville glass fibres and 93.75 g of magnesium nitrate hexahydrate. 93.75 g of kaolin and 565.25 g of calcined gypsum was added to the water and the mixture was mechanically blended for 10 seconds to form a slurry. A small amount of the slurry was poured into a 320 mm×120 mm×12.5 mm silicone mould and glass tissue was pressed into the slurry to the base of the mould. The remaining slurry was poured into the mould and further layer of glass tissue was laid onto the top of the slurry. The sample was dried at 40° C. overnight (minimum 12 hours).

Example 6—Magnesium Nitrate (9 wt %)/Kaolin (9 wt %)

600 g of water at 40° C. was mixed with 3.75 g of John Mansville glass fibres and 75 g of magnesium nitrate hexahydrate. 7 g of kaolin and 675 g of calcined gypsum was added to the water and the mixture was mechanically blended for 10 seconds to form a slurry. A small amount of the slurry was poured into a 320 mm×120 mm×12.5 mm silicone mould and glass tissue was pressed into the slurry to the base of the mould. The remaining slurry was poured into the mould and further layer of glass tissue was laid onto the top of the slurry. The sample was dried at 40° C. overnight (minimum 12 hours).

Example 7—Magnesium Hydroxide (9 wt %)/Kaolin 27 wt %)

600 g of water at 40° C. was mixed with 3.75 g of John Mansville glass fibres and 75 g of magnesium hydroxide. 225 g of kaolin and 525 g of calcined gypsum was added to the water and the mixture was mechanically blended for 10 seconds to form a slurry. A small amount of the slurry was poured into a 320 mm×120 mm×12.5 mm silicone mould and glass tissue was pressed into the slurry to the base of the mould. The remaining slurry was poured into the mould and further layer of glass tissue was laid onto the top of the slurry. The sample was dried at 40° C. overnight (minimum 12 hours).

Example 8—Magnesium Chloride (9 wt %)/Kaolin 27 wt %)

600 g of water at 40° C. was mixed with 3.75 g of John Mansville glass fibres and 75 g of magnesium chloride hexahydrate. 225 g of kaolin and 525 g of calcined gypsum was added to the water and the mixture was mechanically blended for 10 seconds to form a slurry. A small amount of the slurry was poured into a 320 mm×120 mm×12.5 mm silicone mould and glass tissue was pressed into the slurry to the base of the mould. The remaining slurry was poured into the mould and further layer of glass tissue was laid onto the top of the slurry. The sample was dried at 40° C. overnight (minimum 12 hours).

Example 9—Magnesium Chloride (11 wt %)/Kaolin (11 wt %)

600 g of water at 40° C. was mixed with 3.75 g of John Mansville glass fibres and 93.75 g of magnesium chloride hexahydrate. 93.75 g of kaolin and 656.25 g of calcined gypsum was added to the water and the mixture was mechanically blended for 10 seconds to form a slurry. A small amount of the slurry was poured into a 320 mm×120 mm×12.5 mm silicone mould and glass tissue was pressed into the slurry to the base of the mould. The remaining slurry was poured into the mould and further layer of glass tissue was laid onto the top of the slurry. The sample was dried at 40° C. overnight (minimum 12 hours).

Example 10—Calcium Nitrate (9 wt %4)/Kaolin (27 wt %)

600 g of water at 40° C. was mixed with 3.75 g of John Mansville glass fibres and 75 g of calcium nitrate tetrahydrate. 225 g of kaolin and 525 g of calcined gypsum was added to the water and the mixture was mechanically blended for 10 seconds to form a slurry. A small amount of the slurry was poured into a 320 mm×120 mm×12.5 mm silicone mould and glass tissue was pressed into the slurry to the base of the mould. The remaining slurry was poured into the mould and further layer of glass tissue was laid onto the top of the slurry. The sample was dried at 40° C. overnight (minimum 12 hours).

Example 11—Zinc Nitrate (9 wt %)/Kaolin (27 wt %)

600 g of water at 40° C. was mixed with 3.75 g of John Mansville glass fibres and 75 g of zinc nitrate hexahydrate. 225 g of kaolin and 525 g of calcined gypsum was added to the water and the mixture was mechanically blended for 10 seconds to form a slurry. A small amount of the slurry was poured into a 320 mm×120 mm×12.5 mm silicone mould and glass tissue was pressed into the slurry to the base of the mould. The remaining slurry was poured into the mould and further layer of glass tissue was laid onto the top of the slurry. The sample was dried at 40° C. overnight (minimum 12 hours).

Example 12—Copper Nitrate (7 wt %)/Kaolin (28 wt %)

600 g of water at 40° C. was mixed with 3.75 g of John Mansville glass fibres and 60 g of copper nitrate tetrahydrate. 225 g of kaolin and 525 g of calcined gypsum was added to the water and the mixture was mechanically blended for 10 seconds to form a slurry. A small amount of the slurry was poured into a 320 mm×120 mm×12.5 mm silicone mould and glass tissue was pressed into the slurry to the base of the mould. The remaining slurry was poured into the mould and further layer of glass tissue was laid onto the top of the slurry. The sample was dried at 40° C. overnight (minimum 12 hours).

Example 13—Aluminium Nitrate (9 wt %)/Kaolin (27 wt %)

600 g of water at 40° C. was mixed with 3.75 g of John Mansville glass fibres and 75 g of aluminium nitrate nonahydrate. 225 g of kaolin and 525 g of calcined gypsum was added to the water and the mixture was mechanically blended for 10 seconds to form a slurry. A small amount of the slurry was poured into a 320 mm×120 mm×12.5 mm silicone mould and glass tissue was pressed into the slurry to the base of the mould. The remaining slurry was poured into the mould and further layer of glass tissue was laid onto the top of the slurry. The sample was dried at 40° C. overnight (minimum 12 hours).

Example 14—Magnesium Nitrate (13 wt %)/Rice Husk Ash (13 wt %)

600 g of water at 40° C. was mixed with 3.75 g of John Mansville glass fibres and 93.75 g of magnesium nitrate hexahydrate. 93.75 g of diatomaceous earth and 525 g of calcined gypsum was added to the water and the mixture was mechanically blended for 10 seconds to form a slurry. A small amount of the slurry was poured into a 320 mm×120 mm×12.5 mm silicone mould and glass tissue was pressed into the slurry to the base of the mould. The remaining slurry was poured into the mould and further layer of glass tissue was laid onto the top of the slurry. The sample was dried at 40° C. overnight (minimum 12 hours).

Example 15—Magnesium Nitrate (11 wt %)/Diatomaceous Earth (27 wt %)

600 g of water at 40° C. was mixed with 3.75 g of John Mansville glass fibres and 93.75 g of magnesium nitrate hexahydrate. 225 g of diatomaceous earth and 525 g of calcined gypsum was added to the water and the mixture was mechanically blended for 10 seconds to form a slurry. A small amount of the slurry was poured into a 320 mm×120 mm×12.5 mm silicone mould and glass tissue was pressed into the slurry to the base of the mould. The remaining slurry was poured into the mould and further layer of glass tissue was laid onto the top of the slurry. The sample was dried at 40° C. overnight (minimum 12 hours).

Example 16—Magnesium Nitrate (1 wt %)/Rice Husk Ash (27 wt %)

600 g of water at 40° C. was mixed with 3.75 g of John Mansville glass fibres and 93.75 g of magnesium nitrate hexahydrate. 225 g of rice husk ash and 525 g of calcined gypsum was added to the water and the mixture was mechanically blended for 10 seconds to form a slurry. A small amount of the slurry was poured into a 320 mm×120 mm×12.5 mm silicone mould and glass tissue was pressed into the slurry to the base of the mould. The remaining slurry was poured into the mould and further layer of glass tissue was laid onto the top of the slurry. The sample was dried at 40° C. overnight (minimum 12 hours).

A summary of the sample formulations is shown in Table 1.

TABLE 1

Summary of sample formulations

| Sample | Amount of stucco/g (wt %) | Amount of pozzolan source/g (wt %) | Amount of metal salt/g (wt %) |
|---|---|---|---|
| Control 1 | 750 (100) | 0 | 0 |
| Control 2 | 525 (70) | 225 (30) kaolin | 0 |
| Control 3 | 750 (90) | 0 | 75 (10) |
| Control 4 | 750 (90) | 0 | 75 (10) |
| Control 5 | 750 (90) | 0 | 75 (10) |
| Control 6 | 750 (90) | 0 | 75 (10) |
| Example 1 Mg nitrate | 525 (64) | 225 (27) kaolin | 75 (9) |
| Example 2 Mg nitrate | 525 (54) | 225 (23) kaolin | 225 (23) |
| Example 3 Mg nitrate | 600 (67) | 150 (16.5) kaolin | 150 (16.5) |
| Example 4 Mg nitrate | 637.5 (74) | 112.5 (13) kaolin | 112.5 (13) |
| Example 5 Mg nitrate | 656.25 (78) | 93.75 (11) kaolin | 93.75 (11) |
| Example 6 Mg nitrate | 675 (82) | 75 (9) kaolin | 75 (9) |
| Example 7 Mg hydroxide | 525 (64) | 225 (27) kaolin | 75 (9) |
| Example 8 Mg chloride | 525 (64) | 225 (27) kaolin | 75 (9) |
| Example 9 Mg chloride | 656.25 (78) | 93.75 (11) kaolin | 93.75 (11) |
| Example 10 Ca nitrate | 525 (64) | 225 (27) kaolin | 75 (9) |
| Example 11 Zn nitrate | 525 (64) | 225 (27) kaolin | 75 (9) |
| Example 12 Cu nitrate | 525 (65) | 225 (28) kaolin | 60 (7) |
| Example 13 Al nitrate | 525 (64) | 225 (27) kaolin | 75 (9) |
| Example 14 Mg nitrate | 525 (74) | 93.75 (13) rice husk ash | 93.75 (13) |
| Example 15 Mg nitrate | 525 (62) | 225 (27) diatomaceous earth | 93.75 (11) |
| Example 16 Mg nitrate | 525 (62) | 225 (27) rice husk ash | 93.75 (11) |

Collapse Test—Horizontal Fire Test

Samples (250 mm×50 mm) were placed in a furnace at room temperature with their ends supported such that the samples rested horizontally (span between support 210 mm). The samples were heated to 1000° C. over 1.5 hours and then allowed to cool to room temperature. The samples were assessed for collapse after cooling. The distance from the bottom of the sample to the base support was measured in mm. This value was subtracted from 50 mm to give a collapse measurement. The maximum possible collapse measurement (i.e. total collapse) is 50 mm and the minimum possible collapse measurement (i.e. no collapse) is 0 mm. The collapse measurements are shown in Table 2.

TABLE 2

Results of collapse test

| Sample | Amount of pozzolan source in slurry (in dried sample)/wt % | Amount of metal salt in slurry (in dried sample)/wt % | Collapse/mm |
|---|---|---|---|
| Control 1 | 0 | 0 | 50 |
| Control 2 | 30 (26.5) | 0 | 22 |
| Control 3 | 0 | 10 (8.5) | 50 |
| Control 4 | 0 | 10 (8.5) | 50 |
| Control 5 | 0 | 10 (8.5) | 50 |
| Control 6 | 0 | 10 (8.5) | 40 |
| Example 1-Mg nitrate | 27 (24) | 9 (8) | 9 |
| Example 2-Mg nitrate | 23 (21) | 23 (21) | 4.2 |
| Example 3-Mg nitrate | 16.5 (15) | 16.5 (15) | 4.5 |
| Example 4-Mg nitrate | 13 (11) | 13 (11) | 3.5 |
| Example 5-Mg nitrate | 11 (10) | 11 (10) | 5.5 |
| Example 6-Mg nitrate | 9 (8) | 9 (8) | 8 |
| Example 7-Mg hydroxide | 27 (24) | 9 (8) | 14 |
| Example 8-Mg chloride | 27 (24) | 9 (8) | 7 |
| Example 9-Mg chloride | 11 (10) | 11 (10) | 5 |
| Example 10-Ca nitrate | 27 (24) | 9 (8) | 12 |
| Example 11-Zn nitrate | 27 (24) | 9 (8) | 12.5 |
| Example 12-Cu nitrate | 28 (25) | 7 (6) | 14 |
| Example 13-Al nitrate | 27 (24) | 9 (8) | 15 |
| Example 14-Mg nitrate/rice husk ash | 13 (11.5) | 13 (11.5) | 28 |
| Example 15-Mg nitrate/diatomaceous earth | 27 (24) | 11 (10) | 15 |
| Example 16-Mg nitrate/rice husk ash | 27 (24) | 11 (10) | 19 |

It can be seen that the addition of a combination of pozzolan source and a metal salt significantly improves the structural integrity of the sample. Control Example 2 shows that whilst kaolin alone provides some effect, the combination of kaolin with a metal salt provides a much greater effect.

The effect is greatest if:
- the wt % amounts of kaolin and metal salt in the slurry and in the product are equal and between 10 and 25 wt %;
- the amount of kaolin in the slurry and in the product is less than 25 wt %;
- the amount of rice husk ash or diatomaceous earth in the slurry is equal to or greater than 25 w %;
- the metal salt is magnesium nitrate or magnesium chloride.

The invention claimed is:

1. A gypsum wallboard comprising:
40 wt% or greater gypsum,
a pozzolan source, and
a metal salt additive, wherein:
the metal salt additive is provided in an amount between 5 and 25 wt% based on the weight of the gypsum, pozzolan source and metal salt additive, and
the metal salt additive is a salt of magnesium, copper, zinc or aluminium.

2. The wallboard according to claim 1, wherein
the pozzolan source is a kaolinitic clay additive, and
The pozzolan source is included in an amount between 5 and 30 wt% based on the weight of the gypsum, clay additive and metal salt additive.

3. The wallboard according to claim 2, wherein the clay additive is included in an amount between 10 and 25 wt%.

4. The wallboard according to claim 1, wherein
the pozzolan source is rice husk ash or diatomaceous earth, and
the pozzolan source is included in an amount equal to or greater than 20 wt%.

5. The wallboard according to claim 1, wherein the metal salt is a nitrate, carbonate, hydrogen carbonate, sulphate, hydroxide or chloride.

6. The wallboard according claim 1, wherein the wt% amount of metal salt and the wt% amount of pozzolan source is equal.

7. The wallboard according to claim 1, wherein the gypsum is provided in an amount of 50-85 wt%.

8. A gypsum wallboard comprising:
40 wt% or greater of gypsum,
a pozzolan source, and
a metal salt additive, wherein:
the metal salt additive is provided in an amount of 5-25 wt% based on the amount of gypsum, pozzolan and metal salt additive, and
the metal salt additive is a metal hydroxide, a metal hydrogen carbonate, or a chloride of magnesium, copper, zinc or aluminium.

9. The wallboard according to claim 8, wherein
the pozzolan source is a kaolinitic clay additive, and
the pozzolan source is included in an amount between 5 and 30 wt% based on the weight of the gypsum, clay additive and metal salt additive.

10. The wallboard according to claim 9, wherein the clay additive is included in an amount between 10 and 25 wt%.

11. The wallboard according to claim 8, wherein
the pozzolan source is rice husk ash or diatomaceous earth, and
the pozzolan source is included in an amount equal to or greater than 20 wt%.

12. The wallboard according claim 8, wherein the wt% amount of metal salt and the wt% amount of pozzolan source is equal.

13. The wallboard according to claim 8, wherein the gypsum is provided in an amount of 50-85 wt%.

* * * * *